No. 638,981. Patented Dec. 12, 1899.
J. O. NAISTROM.
PROPELLER DISK HARROW.
(Application filed May 27, 1898.)
(No Model.) 3 Sheets—Sheet 1.
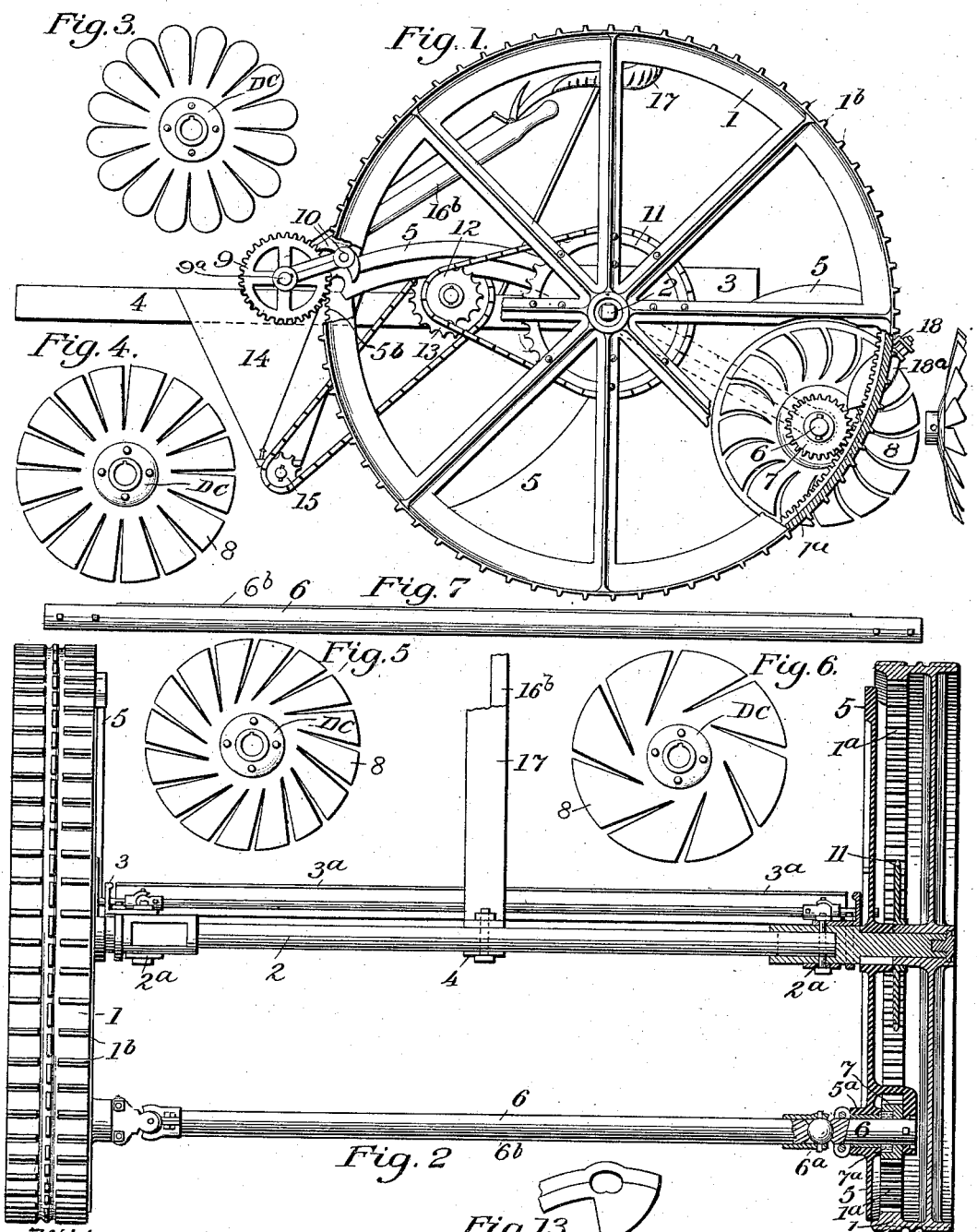
Witnesses
James C. Slater
Aaron B. Schaeffer
Inventor
J. O. Naistrom
THE NORRIS PETERS CO., PHOTO-LITHO., WASHINGTON, D. C.

No. 638,981. Patented Dec. 12, 1899.
J. O. NAISTROM.
PROPELLER DISK HARROW.
(Application filed May 27, 1898.)
(No Model.) 3 Sheets—Sheet 2.
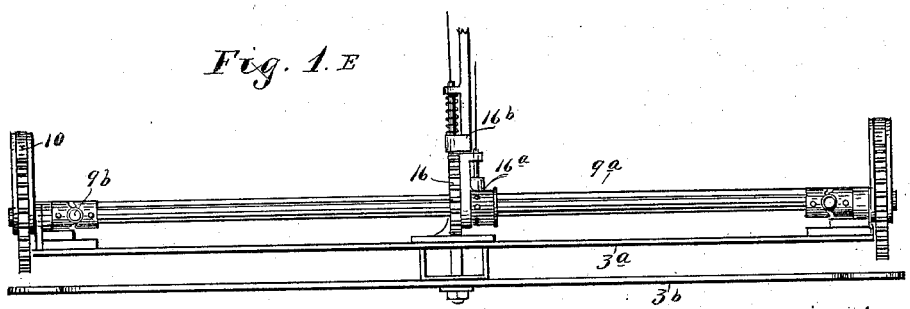
Fig. 1. E
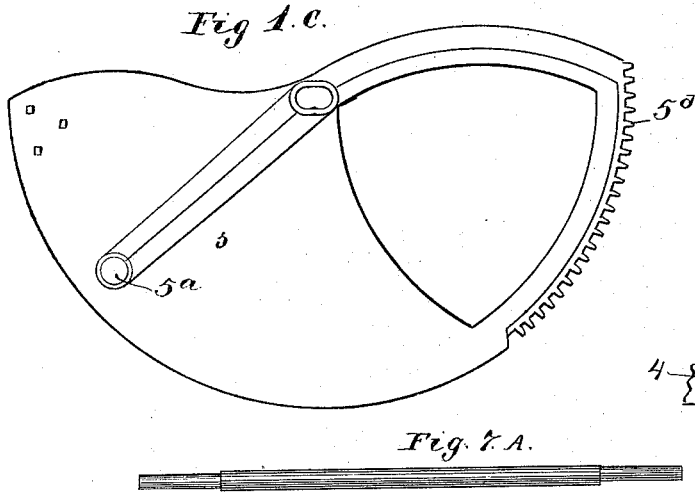
Fig. 1. C.
Fig. 1. F.
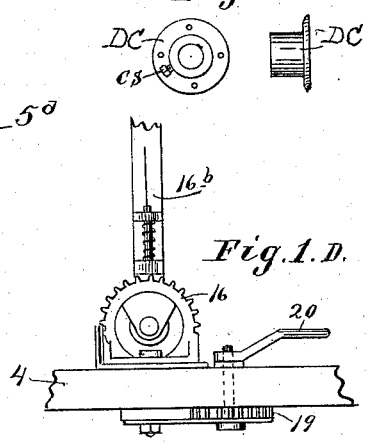
Fig. 1. D.
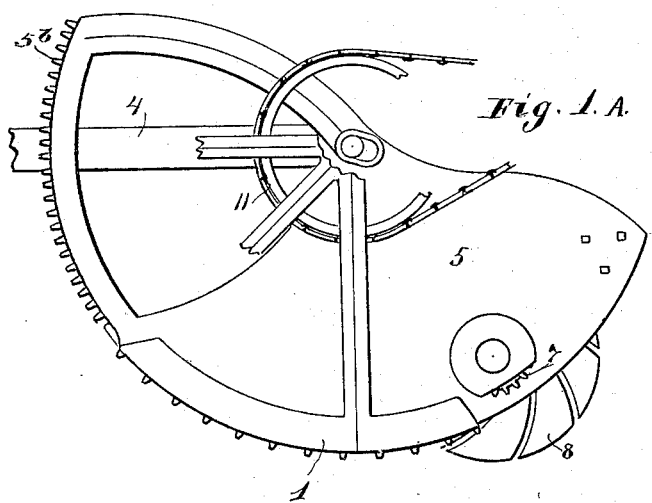
Fig. 1. A.
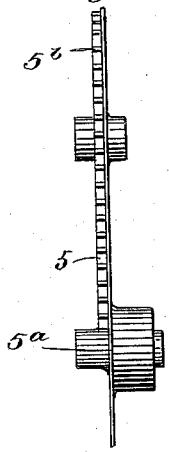
Fig. 1. B.
Witnesses.
F. A. Jacobs.
Harold H. Eads.
Inventor.
John O. Naistrom
THE NORRIS PETERS CO., PHOTO-LITHO., WASHINGTON, D. C.

No. 638,981.  
J. O. NAISTROM.  
PROPELLER DISK HARROW.  
(Application filed May 27, 1898.)

Patented Dec. 12, 1899.

(No Model.)

3 Sheets—Sheet 3.

Witnesses.
James C. Slater.
Aaron B. Schaeffer.

Inventor.
J. O. Naistrom

UNITED STATES PATENT OFFICE.

JOHN O. NAISTROM, OF MINNEAPOLIS, MINNESOTA.

PROPELLER DISK HARROW.

SPECIFICATION forming part of Letters Patent No. 638,981, dated December 12, 1899.

Application filed May 27, 1898. Serial No. 681,957. (No model.)

*To all whom it may concern:*

Be it known that I, JOHN O. NAISTROM, a citizen of the United States, residing at Minneapolis, in the county of Hennepin and State of Minnesota, have invented a new and useful Disk Harrow, Cultivator, and Seeder, of which the following is a specification.

My invention relates to a disk harrow, cultivator, and seeder, which, being constructed according to this specification and the accompanying drawings, will have the following objects: first, to cultivate the soil and seed with more ease and rapidity than heretofore done on former principles, and, second, to cultivate the soil to any desired depth necessary and simultaneously therewith seed, without waste or use of any extra or special time or labor for either, and properly cover the seeds and turn and mix the soil with which it is brought in contact. I attain these objects by the mechanism described in this specification and illustrated in the accompanying drawings, of which—

Figure 9:
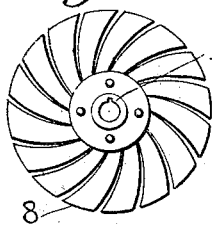
Figure 10:
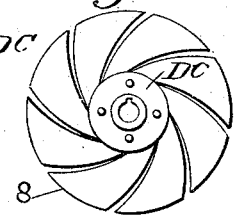
Figure 8:
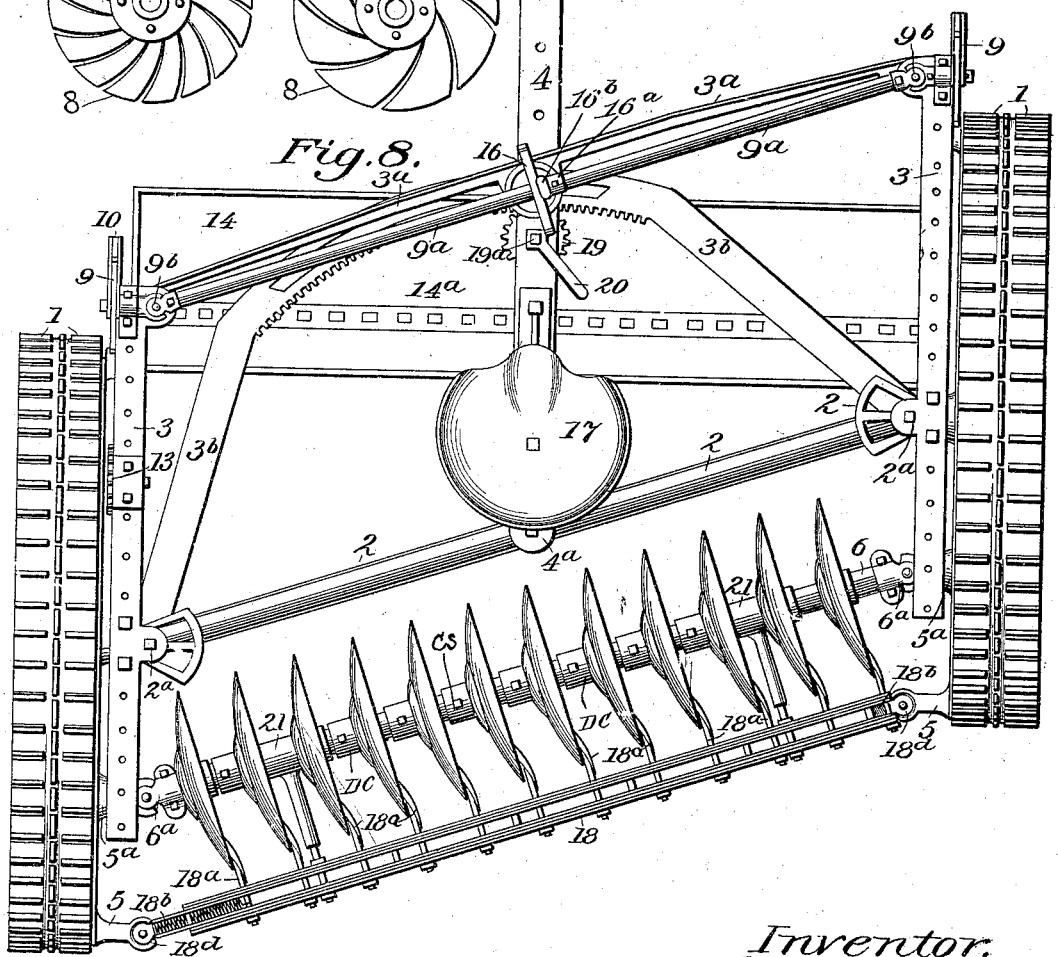

Figure 1 is a side view of the harrow; Fig. 2, a view from the rear of the harrow as it appears after the removal of the disks and the seeding-hopper, of which the right-hand part is a cross-section thereof. Figs. 3, 4, 5, 6, 9, and 10 are side views of different kinds of disks to be used for the harrow; Fig. 7, a straight disk-shaft without tumbling-joints; Fig. 8, a top view of the harrow; Fig. 1$^A$, a side view of a part of the harrow, showing regulating-arm or side shield; Fig. 1$^B$, an end, and Fig. 1$^C$ a side, view of the side shields; Fig. 1$^D$, a side view of the regulating-coupling and part of the lever; Fig. 1$^E$, a rear view of regulating-axle, gears, and coupling; and Fig. 1$^F$, side and end views of one of the disk-collars.

Similar numbers and letters refer to similar parts throughout the several views.

The traction-wheels 1, mounted upon axle 2, with side stringers 3, which are bolted firmly to said axle 2, and the cross-bar 3$^a$, with ends bolted to the foremost ends of side stringers 3, and also bolted to the center pole 4, the brace 3$^b$, with saddle and supporter 17, as shown in the several figures, constitute the frame of the harrow.

The traction-wheels 1 are mounted upon axle 2 and provided with inside gearing at the rim, as indicated at 1$^a$, sprocket-gears 11, and projecting bars 1$^b$ around their peripheries to prevent sliding upon the ground, as shown and indicated.

The axle 2 may be made in three parts and provided with horizontally-operative joints, as shown at 2$^a$. The disk-shaft 6, regulating-gear shaft 9$^a$, and the scraper-bar 18 may be also made in three separate parts and provided with tumbling (ball-and-pivot) joints, (marked 6$^a$, 9$^b$, and 18$^d$,) all on parallel and uniform lines with and near the traction-wheels, that the same may operate with ease and uniformity at any angle the harrow may be set. The harrow is further provided with a straight main axle and disk-shaft without tumbling-joints, which may be used instead of those with tumbling-joints when the harrow is operated in a square position.

The ends of the adjusting-brace 3$^b$ are closely but loosely bolted to the main-axle joints 2$^a$. The said brace is provided with a slide opening through its circular part and is held in proper position by means of a bolt, with nut running through said slide-opening, the center pole 4, cross-bar 3$^a$, and the coupling apparatus 16 at their intersection. The adjusting-gear 19, with key 20, is held by a bolt 19$^a$ onto the center pole 4, in operative connection with the inside gearing of the said circular brace 3$^b$, and by said gear 19, with key 20, the said adjusting-brace 3$^b$ may be swung to one side or the other and the harrow changed to any desired angle.

The center pole 4, carrying supporter and saddle 17, is attached to the axle 2 by a bolt and nut 4$^a$, running straight forward from said axle 2 midway and parallel with and between traction-wheels 1. Said pole 4 and the harrow otherwise may be constructed so it can be attached to any wagon-truck, hitched direct to a team, or adapted to be operated by hand or any other power.

The disk or disks 8 are made of a substantially continuous circular piece of such weight and quality of material as to make them strong enough and suitable for the purpose. The part or the greater portion thereof extending outside of the periphery of the driving-gears 7 is divided into a suitable number of blades—say from six to sixteen, according to the size of the disk or disks—and their speed of revolution of similar size and form properly shaped, curved, bent, and twisted to right or left, or both, as may be desired, in the same manner all around and extending from the periphery diagonally to a suitable distance from the center of said disk or disks, with the foregoing sharp cutting edges sufficiently slanting and reclining, so that roots, weeds, and other obstructive matter otherwise liable to collect in the spaces between the edges of and on said blades may slide or be thrown off rather than collect thereon when the disk or disks are rotating and in operative contact with the soil. The said disk or disks are furthermore adapted to be firmly set by means of bolts and nuts or screws onto collars (marked D C) constructed for the purpose, which are loosely and closely fitted upon disk-shaft 6, so as to be slid on and off or firmly set thereon by means of set-screws C S at any desired point or distance apart. Said shaft is provided with a spline $6^b$ to prevent said collars from turning around when in operation and heavy contact with the soil.
The concave disks, as shown in Fig. 8, are not included in this specification otherwise than for the purpose of showing that they may be mounted on the disk-shaft in the same manner as the disks previously described.
The regulating-arms, side shields, and gear-protectors 5, constructed in any shape suitable for the purpose, are to rotate upon axle 2, with bearings $5^a$ in their downward-extending extremities, in which is mounted the disk-shaft 6, geared in operative connection with power or traction gears $1^a$. The upward-extending extremities are adjustably adapted or geared, as shown at $5^b$ in Fig. 1 and elsewhere, in operative connection with the regulating-gear 9 and provided with an elliptic-shaped center bearing (shown in Figs. 13, $1^A$, and $1^C$) resting upon axle 2 and adapted to be pulled forward with couplings 10 when brought to a position, as shown in the figures, enough to detach shaft 6 from the traction-gears.

The disk-shaft 6, whether made in three parts or one, with or without tumbling-joints, is journaled in bearings near the ends of the downward-pointing extremities of the regulating-arms or side shields 5. Said shaft is provided with driving-gears 7 and self locking and unlocking gear-couplings $7^a$, so as to be operated in a forward direction or the same direction as the traction-wheels, with sufficient power and speed of revolution to properly cultivate the soil with which the disk or disks mounted or set thereon are brought in operative contact. Said gear-couplings are adapted to lock and engage said shaft with said gears when said gears are turned or moved forward, thereby causing said disk-shaft and disks to rotate in a forward direction or to unlock or disengage said shaft when the said gears are turned or moved backward, as may be required when in operation. By means of said regulating-arms, gears 9, lever, and coupling the said disk-shaft may be raised, lowered, or disengaged from operative connection from the traction-wheels or power-gears, as may be desired.

Regulating-gears 9 are firmly set upon and near the ends of shaft $9^a$, which is mounted in bearings upon the frame or side stringers 3, so that said gears may operatively engage with the upward-pointing geared ends or sides of regulating-arms 5. The latch-couplings 10 are mounted upon shaft $9^a$, so as to be swung independently around by the hand, and thereby brought in position to engage gears 9, and the neck a projecting notched part of arms 5, as shown in Fig. 1, and when the said arms 5, by means of said coupling-gears, lever $16^b$, and other arrangements, as elsewhere described, are turned to a point where the movable curved latch of said couplings 10 will engage the said neck at the termination of the geared part of said arms 5 and gears 9 the said arms 5, by means of said couplings 10, gears 9, and lever $16^b$, may by the hand be pulled forward or off their centers, so as to disengage shaft 6 with gears from traction or power gears, as may be desired.

Coupling 16 consists of a half-circular vertical gear with a circular base resting upon cross-bar $3^a$ and is held in position by means of a suitable bolt, with nut running vertically through the center of the base of said coupling cross-bar $3^a$, pole 4, and brace $3^b$ at their intersection. Lever $16^b$ is mounted upon axle or shaft $9^a$, so as to rotate thereon between said coupling 16 and collar $16^a$, and is provided with lock-bolts, springs, and hand-pulls on both sides, by means of which the said lever may be coupled to said collar and gear, one independently of the other. Collar $16^a$ is firmly held on shaft 9 by means of a key and set-screw, one being opposite the other. The scraper-bar is constructed in three main parts and provided with tumbling-joints near the traction-wheels on uniform lines with other tumbling-joints of the harrow. The end parts thereof are firmly bolted to the regulating-arms at points properly distant from the disk-shaft 6. The middle main part is made in two separate parts, so that one will slide inside of the other. The scrapers $18^a$ are adapted to be firmly fastened by means of nuts to the outside bar, and the inside bar has openings, so as to allow the outside bar, with scrapers, to slide one way or the other independently thereof, whereby the said scrapers are held in a position to clean the disks. Said bar is also provided with springs $18^b$ and collar-braces 21, steadily combining and bracing said scraper-bar and disk-shaft. The scrapers $18^a$ are oblong thin concave-shaped blades with sharp circular edges and are adapted to be set on either side of the disks in a position so as to properly clean the said disks as the same are rotating. The said scrapers will also serve to turn the soil over.

The seeding and grain hopper, of which 14 in Fig. 1 is the end view, is adapted to be attached to the frame of the harrow. Sprocket 15 is firmly set on a shaft having pockets and running through at a point just below the upper side of the bottom of said hopper, in which there are openings to intersect with the pockets in said shaft. The hopper or apparatus is also provided with a regulating-slide, with openings to intersect with openings in the bottom of said hopper and adapted to slide with means to open, lessen, and close the said openings and distribute a suitable quantity of seed or grain as will be desired, and adjustment arrangements to open and close the openings in bottom of said hopper and shaft, and is operated by means of endless chains from traction-gear 11 upon sprockets 12 and 13 and from sprocket 13 to said sprocket 15.

What I claim as my invention, and desire to secure by Letters Patent, is—

1. In a disk harrow and seeder, the combination of traction-wheels 1, independently journaled upon axle 2, pole 4 attached to the center of axle 2 and running forward parallel with the traction-wheels, with support and saddle 17, a frame with side stringers 3, firmly set upon axle 2, a cross-bar $3^a$, a semicircular brace $3^b$ provided with a long slot, a bolt running through the intersection of the center of cross-bar $3^a$, center pole 4, the brace $3^b$, coupling 16, a regulating-shaft $9^a$ with gears 9 and couplings 10, collar $16^a$, lever $16^b$, gear 19, bolt $19^a$ and key 20, fittingly and operatively arranged and connected, as and for the purpose shown and described.

2. The combination, in a disk harrow and cultivator, of an axle 2 and the geared traction-wheels 1, independently journaled thereon, the frame mounted on said axle 2, the regulating-arms or side shields 5, mounted to balance in bearings on said axle 2, a disk-shaft 6, adapted to carry disks 8 and journaled in bearings provided in the downward-pointing extremities of said regulating-arms or side shields, the disks 8 adapted to be slid on or off or set at any desired point on said shaft 6, gears 7 and gear-couplings $7^a$ provided on said shaft 6 operatively connecting said disk-shaft and the said traction or power wheels, whereby the said disk-shaft with disks 8 may be operated in a forward direction or the same direction as the traction-wheels, substantially as shown and described.

3. In a disk harrow and seeder, the combination of the traction-wheels, axle, frame, regulating-arms or side shields, as herein set forth, the disk-shaft 6, journaled in bearings in the lower extremities of said regulating-arms or side shields, and provided with driving-gears 7, gear-couplings $7^a$ operatively connected and engaged with the traction or power gears; the said regulating-arms or side shields having oblong center bearings suitably adapted to rotate and slide forward and backward upon axle 2, the upward-extending extremities thereof being geared and operatively connected with gears and couplings 9 and 10, regulating-shaft $9^a$, with lever and couplings 16 and $16^b$ set in a suitable position upon the frame of the harrow, whereby the said disk-shaft may be regulated, lowered, raised, or detached from operative connection with said traction or power gears, as and for the purpose shown and described.

4. In a disk harrow and seeder, the combination of the traction-wheels 1 with axle 2, the former having stringers 3, cross-bar $3^a$ and brace $3^b$, regulating-arms, a scraper-bar and a disk-shaft, as herein set forth, the said axle 2, stringers 3, cross-bar $3^a$ and brace $3^b$, having fittingly and horizontally constructed joints; the scraper-bar 18, disk-shaft 6 and regulating-shaft $9^a$, having tumbling-joints, all on uniform and parallel lines with and near by the traction-wheels, so that the harrow can be changed or set to and operated with ease at any desired angle, as shown and described.

5. In a disk harrow and seeder, the combination of the traction-wheels 1, axle 2, a frame and regulating-arms 5 thereon mounted, a disk-shaft 6, adapted to carry disks 8 and journaled in the downward-pointing extremities of said arms 5 the means whereby said shaft may be operated, controlled and regulated as described, disks 8, shaped and bladed as described, and removably adapted on said shaft 6 to rotate therewith, a scraper-bar 18, carrying scrapers $18^a$, held in position to clean the disks and braces 21, steadily combining said shaft and scraper-bar, substantially as shown and described.

6. In a disk harrow and seeder of the class specified, the combination of traction-wheels, an axle 2, a suitable frame mounted thereon, regulating-arms 5, a disk-shaft 6, disks 8 removably mounted on said shaft adapted to rotate therewith, said disks 8 formed of a series of blades of similar size and form, shaped, curved, bent and twisted substantially as shown and described, said regulating-arms 5 adapted to rotate or balance on said axle 2, said arms 5 provided with downward-pointing ends forming bearings for said shaft 6, driving-gears 7 provided in connection with said shaft 6, gear-couplings $7^a$ operatively connected with said shaft 6 gear 7 and said traction or power wheels whereby said shaft with said disks 8 may be regulated, controlled and operated as desired.

7. In a disk harrow and cultivator of the class described, the combination of traction-wheels, a frame suitably mounted thereon, regulating-arms 5, and regulating means as described, a disk-shaft 6 mounted in bearings in the lower ends of said arms 5, disks 8 mounted on said shaft 6 and adapted to rotate therewith, each disk 8 being formed of a series of blades similar in size and form and shaped, curved, bent and twisted substantially as described, driving-gears 7, gear-couplings $7^a$, said gears 7 being operatively connected with said traction-wheels, and gear-couplings adapted to engage said disk-shaft 6 and gears 7 whereby as said gears 7 are operated in one direction said disk-shaft is rotated and as said gears are operated in a reverse direction said shaft remains stationary, and a scraper-bar, carrying a series of scrapers, supported in position to bring respective scrapers into position to scrape respective disks, substantially as described.

J. O. NAISTROM.

Witnesses:
JAMES C. SLAFTER,
AARON B. SCHAEFFER.